US012585773B2

(12) United States Patent
Hoogerbrugge et al.

(10) Patent No.: US 12,585,773 B2
(45) Date of Patent: Mar. 24, 2026

(54) USING APPROXIMATE MEMBERSHIP QUERY FILTERS FOR EFFICIENT CONTROL FLOW INTEGRITY PROTECTION

(71) Applicant: NXP B.V., Eindhoven (NL)

(72) Inventors: Jan Hoogerbrugge, Helmond (NL);
Marcel Medwed, Graz (AT)

(73) Assignee: NXP B.V., Eindhoven (NL)

( * ) Notice: Subject to any disclaimer, the term of this patent is extended or adjusted under 35 U.S.C. 154(b) by 201 days.

(21) Appl. No.: 18/506,639

(22) Filed: Nov. 10, 2023

(65) Prior Publication Data
US 2025/0156543 A1      May 15, 2025

(51) Int. Cl.
*G06F 21/00*        (2013.01)
*G06F 21/56*        (2013.01)

(52) U.S. Cl.
CPC ...... *G06F 21/566* (2013.01); *G06F 2221/034* (2013.01)

(58) Field of Classification Search
CPC .... G06F 9/321; G06F 21/566; G06F 9/30145; G06F 21/54; G06F 9/3836; G06F 21/52; G06F 2221/034
See application file for complete search history.

(56) References Cited

U.S. PATENT DOCUMENTS

| | | | |
|---|---|---|---|
| 2008/0256346 A1 | 10/2008 | Lee et al. | |
| 2013/0160121 A1* | 6/2013 | Yazdani | G06F 21/54 |
| | | | 726/23 |
| 2020/0004536 A1* | 1/2020 | Shevgoor | G06F 9/3858 |
| 2020/0257805 A1* | 8/2020 | Courousse | G06F 9/3005 |

OTHER PUBLICATIONS

Mario Werner et al., "Protecting the Control Flow of Embedded Processors against Fault Attacks"; Int'l Conf. on Smart Card Res. & Advanced Applications, 2015, 17 pages, Bochum, Germany.
Approximate Membership Query Filter, last visited Sep. 14, 2023, https://en.wikipedia.org/wiki/Approximate_Membership_Query_Filter, 4 pages.
Thomas Mueller Graf et al., "Binary Fuse Filters: Fast and Smaller Than Xor Filters"; J. of Experimental Algorithmics, Jan. 4, 2022, vol. 27, 15 pages, arXiv:2201.01174v1 [cs.DS].
Joakim Ohlsson et al., A Study of the Effects of Transient Fault Injection into a 32-bit RISC with Built-in Watchdog, FTCS-22: The Twenty-Second Int'l Symp. on Fault-Tolerant Computing, 1992, pp. 316-325, doi: 10.1109/FTCS.1992.243569, Boston, USA.
Michael A. Schuette et al., "Processor Control Flow Monitoring Using Signatured Instruction Streams"; IEEE Transactions on Computers, Mar. 1987, pp. 264-276, vol. C-36, No. 3, doi: 10.1109/TC.1987.1676899.
Thomas M. Galla et al., "Control Flow Monitoring for a Time-triggered Communication Controller"; 10th Eur. Workshop on Dependable Computing (EWDC-10), 1990, 6 pages, Vienna, Austria.

* cited by examiner

*Primary Examiner* — Tri M Tran

(57)        ABSTRACT
A method includes fetching, at a program counter value, an instruction of a basic block of code; decoding the instruction; updating a checksum value with a checksum of the instruction; and determining whether a tuple of the program counter value and the checksum value is in an approximate membership query filter (AMQ-filter).

20 Claims, 5 Drawing Sheets

400

START

410

COMPILE APPLICATION TO BINARY IMAGE

420

DETERMINE BASIC BLOCKS IN BINARY IMAGE

430

COMPUTE CHECKSUM FOR EVERY BASIC BLOCK

440

FOR EVERY BASIC BLOCK BB DO:
ADD (last_pc(bb), CHECKSUM(bb)) TO AMQ-FILTER

450

SHIP AMQ-FILTER WITH BINARY IMAGE

460

END

470

USING APPROXIMATE MEMBERSHIP QUERY FILTERS FOR EFFICIENT CONTROL FLOW INTEGRITY PROTECTION

BACKGROUND

Technical Field

This disclosure relates to protecting a processing core from a fault attack and, in particular, to performing such protection with a checksum.

Related Art

Currently, an attacker can apply fault attacks on an instruction stream to skip or change instructions to attack a computer system. Fault attacks are typically performed by changing a clock period or power supply voltage for a short amount of time. The fault attacks can cause a programmable core to operate outside the conditions for which it has been designed, leading to skipping or changing the instructions.

DETAILED DESCRIPTION

Figure 1:
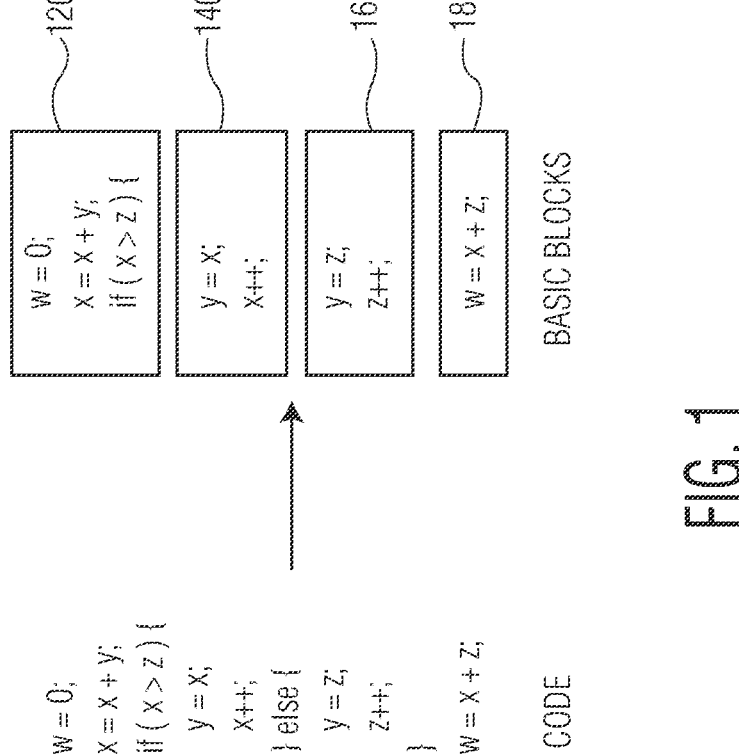
FIG. 1 illustrates an exemplary mapping between code and basic blocks.

Various implementations of the present disclosure can adopt a probabilistic approach using an Approximate Membership Query Filter (AMQ-filter). The AMQ-filter "stores" checksum information with a small, adjustable risk of a false positive result.

In various implementations, a code compiler fills the AMQ-filter with program counter and checksum tuples, and the AMQ-filter then can be added as a hardware module to augment a processor core. The processor sends a tuple of a program counter value and a checksum value to the AMQ-filter, and the AMQ-filter determines if the tuple is a member of the AMQ-filter. Thus, select implementations can achieve protection with lower performance overhead and code size overhead. Further, the AMQ-filter can allow for a fine-grain tradeoff between security and code size overhead. For example, some implementations further can increase the small risk of a false positive for a lower performance overhead and memory storage overhead, thereby potentially increasing performance and reducing costs.

Some current countermeasures address fault attacks based on basic blocks of code. A basic block generally is a straight-line code sequence with no jumps to or from the middle of basic block. Accordingly, one countermeasure is to compute checksums, e.g., a cyclic redundancy check (CRC), over the instructions in a basic block.

The last instruction of a basic block is typically a jump, branch, call, or return instruction. The present disclosure refers to such an instruction as "a trigger instruction." After executing a trigger instruction at run-time, the countermeasure compares the checksum against an expected checksum value. If the checksum and the expected checksum value differ, then it is concluded that a fault attack has been applied, and proper action is taken.

In such a countermeasure, the expected checksum values, which are computed at compile-time, are passed to hardware, so that the hardware can perform the check. Normally, the expected checksum values are passed in the instruction stream. This embedding is costly in terms of performance and code size.

Fault attacks can be prevented by embedding an expected checksum value of a basic block in an instruction stream. Then, whether the actual checksum of the basic block matches the expected checksum is determined. Such a deterministic approach can be slow and memory intensive.

In general, the instruction content of every basic block is different. Conventionally, fault attack countermeasures provide an expected checksum value for every basic block that is used for verification by that block's trigger instruction. Alternatively, a system can be configured for a fixed, expected checksum, and the checksum can be initialized with a basic-block-specific value at the beginning of the respective basic block. In both cases, at least one instruction is added to every basic block, which is costly in performance and code size. The reason is that most basic blocks are small, with the average being around 4 to 5 instructions. Adding an instruction to a basic block for fault attack protection is therefore costly, as it increases the size of the average block by about 20%.

There is an additional issue with adding instructions to the instruction stream for fault protection. Specifically, these instructions should be as small as possible to reduce the code-size overhead but still should carry a large immediate value. The result is that such protection is also costly in the instruction encoding space. This cost could lead to problems when the protection is combined with other extensions that use space in the instruction encoding space, as well.

Many implementations of the present disclosure do not add instructions to the instruction stream to carry expected checksum values. Rather, various implementations can use the AMQ-filter to query the validity of pairs of the PC (program counter) (e.g., address) of a trigger instruction and the expected checksum value at that trigger instruction.

An AMQ-filter is a memory-efficient data structure that provides membership queries with a limited number of false positives. The AMQ-filter can be at least partially implemented in hardware. In various implementations, the AMQ-filter is populated with valid pairs of PC and checksum values by the code compiler or another software tool.

To achieve high storage efficiency, the AMQ-filter typically does not actually store the pairs of PC and checksum values. Rather, many AMQ-filters are implemented via hashing. Thus, the AMQ-filter cannot return the pairs of PC and checksum values. Instead, the AMQ-filter only can tell whether a particular PC and checksum tuple has been added to the AMQ-filter, i.e., its membership.

In several implementations of the present disclosure, the processor core passes the current PC and current checksum value at every trigger instruction to the AMQ-filter. The AMQ-filter then performs a query to verify whether the checksum is valid for the provided PC by querying that the tuple (PC, checksum) is in the AMQ-filter. In normal situations, the query reports that the provided PC and checksum pair is in the AMQ-filter. Under a fault attack, the provided PC and checksum pair is very likely not in the AMQ-filter. The AMQ-filter can report this absence to the processing core, which then can take a proper action against the fault attack.

Because the AMQ-filter does not actually store the pairs of PC and checksum values, the storage efficiency of the AMQ-filter comes at a cost of a controllable false positive rate. That is, with a low probability, the AMQ-filter can report that some PC and checksum tuple is a member of the AMQ-filter, while that tuple is not actually a member of the AMQ-filter. On the other hand, a conventional AMQ-filter never generates a false negative result: that is, when queried about a PC and checksum value pair that should be in the AMQ-filter, a conventional AMQ-filter always correctly reports that the pair is a member of the AMQ-filter.

In the case of such a false positive by the AMQ-filter, an attack might not be noticed. The AMQ-filter can be configured such that the probability of a false positive is acceptably low.

Indeed, even conventional approaches sometimes yield false positives. That is, even in a conventional approach without an AMQ filter, some faults go undetected. For example, one conventional fault attack countermeasure uses a fixed expected checksum. An attacker might learn that basic blocks are protected by a CRC of a certain width in such a system. Thus, the attacker might be able to manipulate the instructions of their malicious code such that the instruction stream has the same CRC value. In this situation, a conventional countermeasure would yield a false positive.

Thus, fault attack protection can be realized by both the code compiler and an AMQ-filter hardware extension to the programmable core. Compilers typically build for each function that they are compiling an internal data structure called a control flow graph. The nodes in this graph represent basic blocks that contain instructions that are executed in sequence.

FIG. 1 illustrates an exemplary mapping 100 between code and basic blocks. In the example of FIG. 1, the code corresponds to four basic blocks of code. The first basic block 120 is formed by the code concluding with an IF evaluation. The IF evaluation can be considered a trigger instruction. The second basic block 140 is formed by the code that is the consequent of the IF evaluation. The third basic block 160 is formed by the code that is the alternative to the IF evaluation. The fourth basic block 180 is the code following the IF evaluation.

As illustrated in FIG. 1, there are no jumps to somewhere in the middle of the basic blocks and no jumps from somewhere into the middle of the basic blocks.

To ease understanding of the concept of a basic block, the basic blocks of FIG. 1 are written using code at a relatively high level. Accordingly, some of these basic blocks do not explicitly include a trigger instruction. Rather, prior to execution, the high-level code of FIG. 1 typically is compiled into code at a relatively lower level. For example, for a 64-bit ARM instruction set, the code "if (x>z)" can be compiled into two instructions, "cmp w1, w2" and "b.ge." The first instruction, "cmp w1, w2," compares the contents of register w1 and the contents of register w2. Here, the register w1 can contain the value x, and the register w2 can contain the value z. The second instruction, "b.ge," performs a jump if the previous compare instruction (here, "cmp w1, w2") tested that the contents of the register w1 are greater than the contents of the register w2. Thus, "b.ge" is an example of a trigger instruction for the first basic block, although "b.ge" does not explicitly appear in the first basic block of FIG. 1.

Another example of a basic block from the ARM instruction set might look as follows.

| 575c: | d2800024 | mov | x4, #0x1 | // #1 |
| 5760: | f8647845 | ldr | x5, [x2, x4, lsl #3] | |
| 5764: | f8247825 | str | x5, [x1, x4, lsl #3] | |
| 5768: | 91000484 | add | x4, x4, #0x1 | |
| 576c: | 6b04001f | cmp | w0, w4 | |
| 5770: | 54ffff8a | b.ge | 5760 <Fft+0xe8> // b.tcont | |

In this case, b.ge is a branch instruction and is therefore the trigger instruction of this basic block. Many implementations of the present disclosure work by computing, both at compile-time and at run-time, a checksum of the instructions of the basic block. An example of a suitable checksum is the cyclic redundancy check (CRC) checksum.

So, the checksum is calculated over d2800024, f8647845, . . . 54ffff8a, both at compile-time and at run-time. Then, at run-time, the equality of the run-time checksum is verified against the compile-time checksum, at least partially based on the PC of the trigger instruction. If the two checksum values are not equal, then an attacker has injected a fault in the instruction stream somehow.

In many implementations, at compile-time, the code compiler conveys computed checksum values to the hardware for every basic block. This conveyance should be done efficiently to limit the cost of the protection. Thus, according to various implementations of the present disclosure, the compiler (or another software tool) builds an AMQ-filter that holds, for every trigger instruction, a tuple of its program counter (e.g., its address) and the expected checksum value. The AMQ-filter can store this information very efficiently in memory.

Referring to the previous basic block example, if the CRC of d2800024, f8647845, . . . 54ffff8a is 5dc028e, then the tuple (5770, 5dc028e) can be added to the AMQ-filter. As shown above, 5770 is the address of the trigger instruction.

Figure 2:
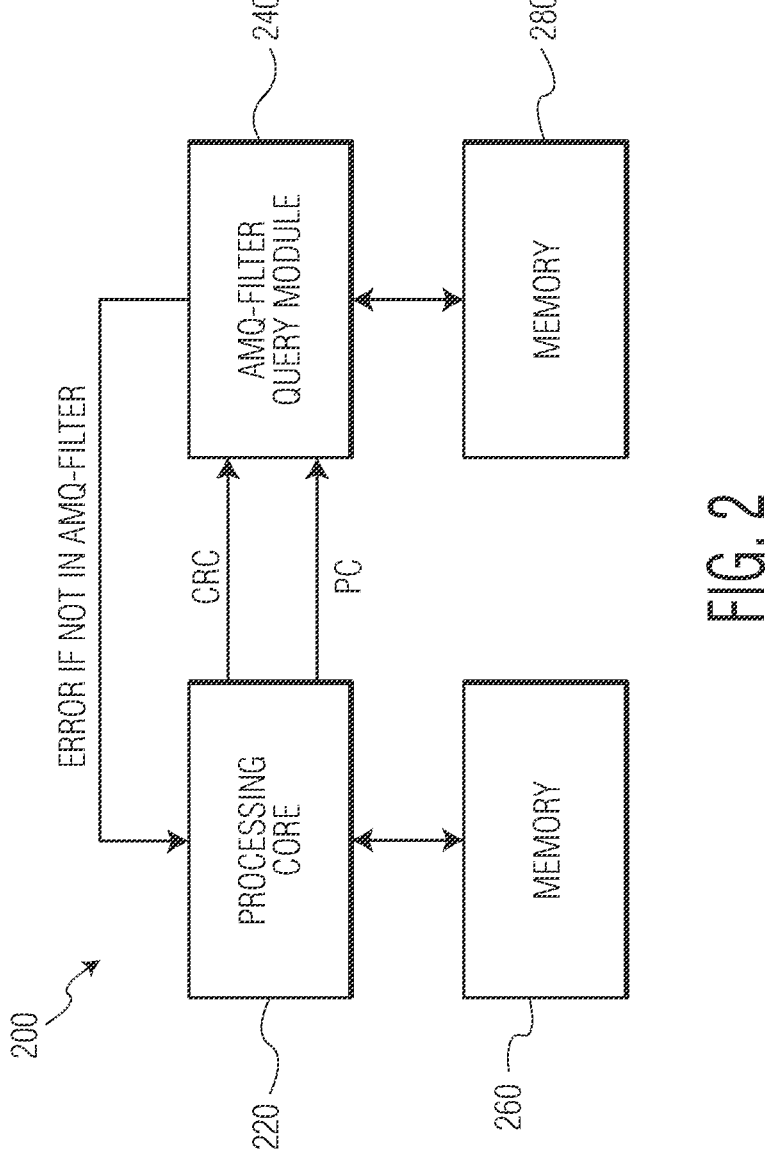
FIG. 2 illustrates a computing device including a processing core augmented with an AMQ-filter query, according to an implementation of the present disclosure.

FIG. 2 illustrates a computing device 200 including a processing core 220 augmented with an AMQ-filter, according to an implementation of the present disclosure. The computing device 200 can also include memory 260 and memory 280. In the example of FIG. 2, the AMQ-filter is implemented as an AMQ-filter query module 240 hardware extension.

The processing core 220 can send a tuple of its program counter (PC) and the computed checksum value (CRC, in this case) to the AMQ-filter query module 240. In select implementations, the processing core 220 can send the tuple of the PC and the checksum on every trigger instruction encountered by the processing core 220.

The processing core 220 is an example of a means for fetching, at a program counter value, an instruction of a basic block of code, for decoding the instruction, and for updating a checksum value with a checksum of the instruction.

The AMQ-filter query module 240 can determine whether a tuple of the program counter value and the checksum value is valid. In several implementations, the AMQ-filter query module 240 applies one or more hashing functions to produce a hash value, at least in part based on the tuple of the PC and the checksum. To perform the one or more hashing functions, the AMQ-filter query module 240 performs a plurality of operations to read data from memory

280 and performs a plurality of hashing operations, based on the data. Additional operations performed by the AMQ-filter can be specific to the AMQ-filter. Such operations might include one or more XOR operations and/or comparison operations.

The one or more hashing functions can be implemented in various ways. In many implementations, these hashing functions are fast and easily implemented in hardware. In particular implementations, a secure hashing function can be implemented, although secure hashing functions generally are expensive to implement. The AMQ-filter query module 240 can perform a membership query of the tuple, based on the hash value.

As illustrated in FIG. 2, the processing core 220 can transmit a request, via one or more master interfaces, to the memory 260. Such a request can include a program counter value. The memory 260 can return instructions and data at the program counter value via communication infrastructure for the memory 260. The response can include the instructions and the data.

In various implementations, the AMQ-filter query module 240 is implemented in logic written in Verilog or VHDL. The AMQ-filter query module 240 can use a data structure stored in memory 280 that tells, with a probability of a false positive, that whether the tuple is valid (e.g., a member of the set).

Also, via a master interface, the AMQ-filter query module 240 can request data from the memory 280 to execute AMQ tests. The data requested by the AMQ-filter query module 240 can depend on a type of the AMQ-filter. For example, in an implementation of the AMQ-filter as a Bloom filter, then the AMQ-filter query module 240 can load a plurality of single bit values from the memory 280. In an implementation of the AMQ-filter as a XOR filter or a binary fuse filter, then the AMQ-filter query module 240 can load a plurality of hash values from the memory 280. In an implementation of the AMQ-filter as a Cuckoo filter, then the AMQ-filter query module 240 can load from the memory 280 a bucket, where a bucket is defined as a small group of hash values.

In some implementations, the memory 280 is dedicated to the AMQ-filter query module 240. In select implementations, the memory 280 is integrated into (e.g., within) the AMQ-filter query module 240. In another implementation, the memory 280 can be merged with the memory 260, such that the processing core 220 and the AMQ-filter query module 240 operate with the same memory.

If the AMQ-filter query module 240 determines the PC-checksum tuple is not valid (e.g., a member of the AMQ-filter), then the AMQ-filter query module 240 can transmit an error to the processing core 220. In this case, the AMQ-filter query module 240 has detected a fault attack. If the AMQ-filter query module 240 determines the PC-checksum tuple is valid (e.g., a member of the AMQ-filter), then the AMQ-filter query module 240 does not transmit an error to the processing core 220.

In one implementation, the processing core 220 waits for an indication from the AMQ-filter query module 240. In such an implementation, the indication can indicate the existence of an error (e.g., that the tuple is not present in the AMQ-filter query module 240). The indication also can indicate that the AMQ-filter query module 240 believes the tuple is present in the AMQ-filter query module 240 (e.g., the tuple is present or the AMQ-filter query module 24 is returning a false positive). Other implementations are possible, as discussed later.

The AMQ-filter query module 240 is an example of a means for determining whether a tuple of a program counter value and a checksum value is valid.

In some instances, a fault results in a false-positive query result, leaving the fault undetected. The likelihood of such a fault typically is tolerably low, because AMQ-filters have parameters that allow a developer to select the probability of false-positives. However, a lower false-positive rate comes at the cost of more storage of the AMQ-filter.

In many implementations, the AMQ-filter query module 240 has a configuration option that controls the tradeoff between the false positive rate and the memory requirements for the AMQ filter. To achieve a higher level of security, then the false positive rate can be decreased, leading to additional memory usage. On the other hand, to reduce cost, the memory usage can be decreased, at the expense of less security.

A person of ordinary skill in the art can implement many AMQ-filter query functions in hardware. Suitable hardware can include, for example, a Bloom filter, a cuckoo filter, an XOR filter, or a 3-wise binary fuse filter. The 3-wise binary fuse filter includes computing four simple hash functions, performing three memory read operations, and then XORing and comparing the results. The 3-wise binary fuse filter is particularly well-suited for implementations including 10,000 or more tuples.

Figure 3:
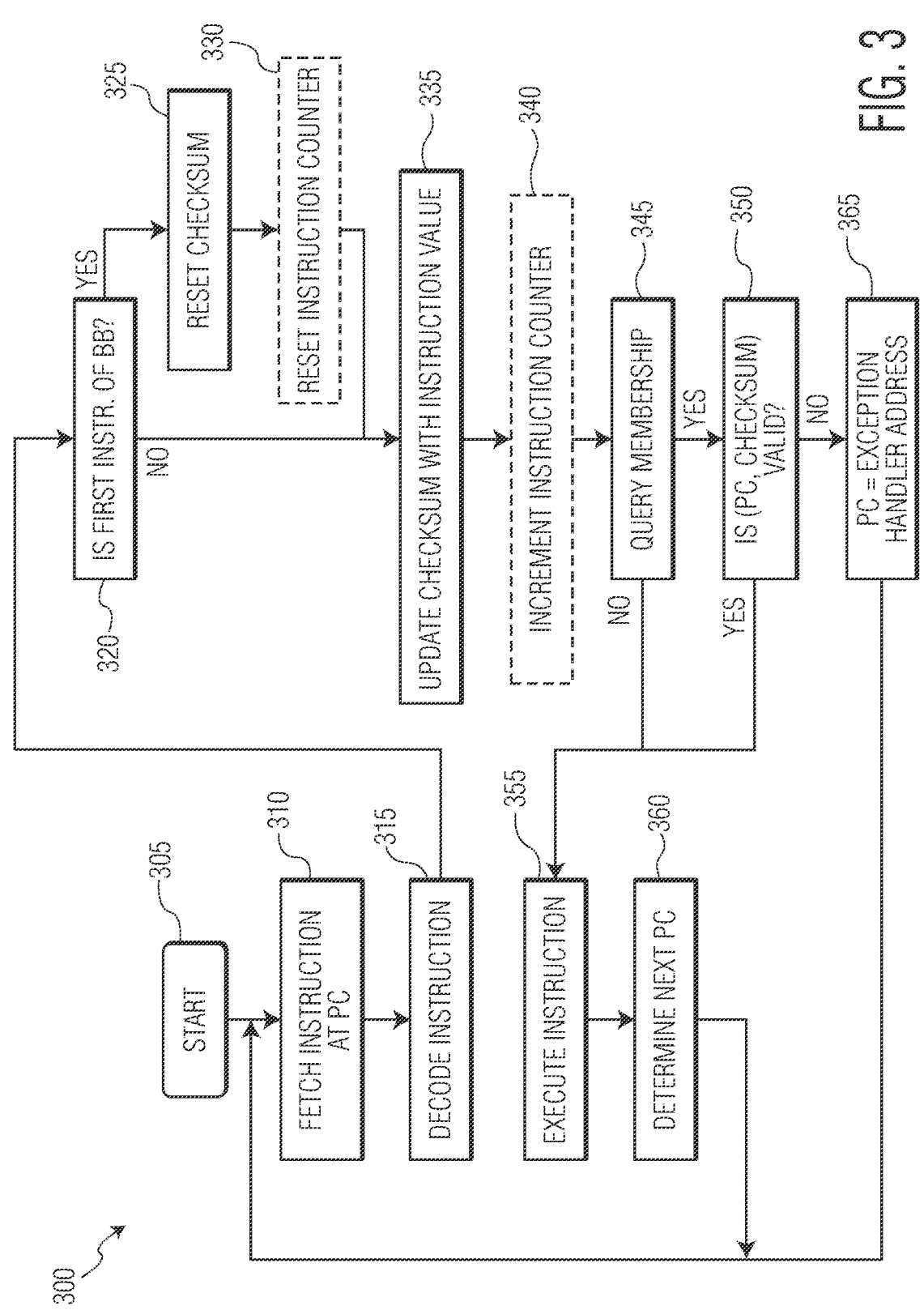
FIG. 3 illustrates an algorithm for control flow integrity protection, according to an implementation of the present disclosure.

FIG. 3 illustrates an algorithm 300 for control flow integrity protection, according to an implementation of the present disclosure.

The algorithm 300 begins at 305 and advances to 310.

In 310, a processing core (e.g., processing core 220) fetches an instruction of a basic block at a current program counter (PC) value. The algorithm 300 then advances to 315.

In 315, the processing core decodes the instruction. The algorithm 300 then advances to 320.

In 320, the processing core determines whether the instruction is the first (e.g., initial) instruction of the basic block. If the processing core determines the instruction is the first instruction of the basic block, then the algorithm 300 advances to 325. If the processing core determines the instruction is not the first instruction of the basic block, then the algorithm 300 advances to 335.

In 325, the processing core resets a checksum value for the basic block. The checksum value can be reset to 0, for example. The algorithm 300 then advances to 330.

In 330, the processing core optionally resets an instruction counter for the basic block. The instruction counter can be reset to 0, for example. The algorithm 300 then advances to 335.

In 335, the processing core updates the checksum value with the value of the checksum of the instruction at the current PC. The processing core can perform this update, for example, by adding the value of the checksum of the instruction to the current checksum value. The algorithm 300 then advances to 340.

In 340, the processing core optionally increments the instruction counter. The algorithm 300 then advances to 345.

In 345, the processing core determines whether to query the validity of a tuple of the program counter and checksum value (e.g., the membership of the tuple in the AMQ-filter).

For example, the processing core can determine whether the instruction is the last instruction of the basic block. For example, the processing core can determine whether the next line of code concludes a case, as indicated by a delimiter. The programming language of the basic block determines characters that can be used as a delimiter. In the example of FIG. 1, the character "}" is an example of a delimiter.

In another example, the processing core can determine whether the instruction is a trigger instruction. In this case, a type of the instruction indicates the end of the basic block. For example, the instruction can be an If, Else, Else If, Jump, Branch, Call, or Return instruction. In an exemplary implementation involving the 64-bit ARM instruction set, trigger instructions can include "b" (unconditional branch), "b.eq" (conditional branch), "bl" (function call), and "ret" (function return).

Thus, if the next line of the code concludes a case or if the present instruction is a trigger instruction, then the processing core determines to query the validity of the tuple, in several implementations.

In addition, to provide additional and/or independent protection, the processing core also or alternatively can determine whether the instruction counter exceeds a predetermined threshold. For example, some implementations can query the validity of the tuple, after executing a predetermined number of lines of code (e.g., 10 lines of code). If the processing core determines the instruction counter exceeds the predetermined threshold, then the processing core determines to query the validity of the tuple, in select implementations. Alternatively or additionally, in the case the instruction counter exceeds the predetermined threshold, the AMQ-filter can report an error to the processing core to indicate that the instruction counter has exceeded the predetermined threshold.

If the processing core determines to query the validity of the tuple, then the algorithm 300 advances to 350. If the processing core determines not to query the validity of the tuple, then the algorithm 300 advances to 355.

In 350, the AMQ-filter (e.g., the AMQ-filter query module 240) determines whether the tuple of the PC and the checksum value is valid. For example, the AMQ-filter can query whether the tuple of the PC and checksum value is present within the AMQ-filter. In one implementation, the AMQ-filter retrieves a hash value from a memory (e.g., memory 280) to perform this query. If the AMQ-filter determines the tuple of the PC and the checksum value is valid (e.g., is present in the AMQ-filter), then the algorithm 300 advances to 355. If the AMQ-filter determines the tuple of the PC and the checksum value is not valid (e.g., is not present in the AMQ-filter), then the algorithm 300 advances to 365.

In 355, the processing core executes the instruction. The algorithm 300 then advances to 360.

In 360, the processing core determines the next program counter value and advances to that program counter value. The algorithm 300 then returns to 310.

In 365, the processing core sets the program counter value equal to the exception handler address and advances to that address. Thus, the processing core can perform suitable operations to address a fault attack. One such operation is to reset the processing core. Another such operation is to reset the entire chip, thereby resetting the processing core. Resetting the entire chip also would reset other processor cores on the chip, as well as memory on the chip. Another such operation is to erase keys stored in the system.

The algorithm 300 then returns to 310.

FIG. 3 illustrates an implementation in which the processing core waits for an indication from the AMQ-filter whether the tuple is present in the AMQ-filter. In another implementation, the processing core continues to perform the other operations of FIG. 3 (e.g., fetching instructions at 310 and executing instructions at 355) until the processing core receives an error from the AMQ-filter. In such an implementation, operation 350 can be implemented as an interrupt, for example. That is, operation 350 (and operation 365, if appropriate) can occur at any time in FIG. 3. If the processing core receives the error from the AMQ-filter, then the algorithm 300 advances from its current operation to 365.

Further, in some implementations, the operation in 365 alternatively can be or additionally can include a signal external to the processing core. Thus, the AMQ-filter can generate such an external signal as a reaction to a negative membership query. Another processing core in the system can receive the external signal and reset the processing core that transmitted the negative tuple (e.g., processing core 220), reset the system that includes the two processing cores and the AMQ-filter, erase a stored key, or perform another suitable action. In select implementations, the AMQ-filter can transmit the external signal to the reset module on the chip.

Figure 4:
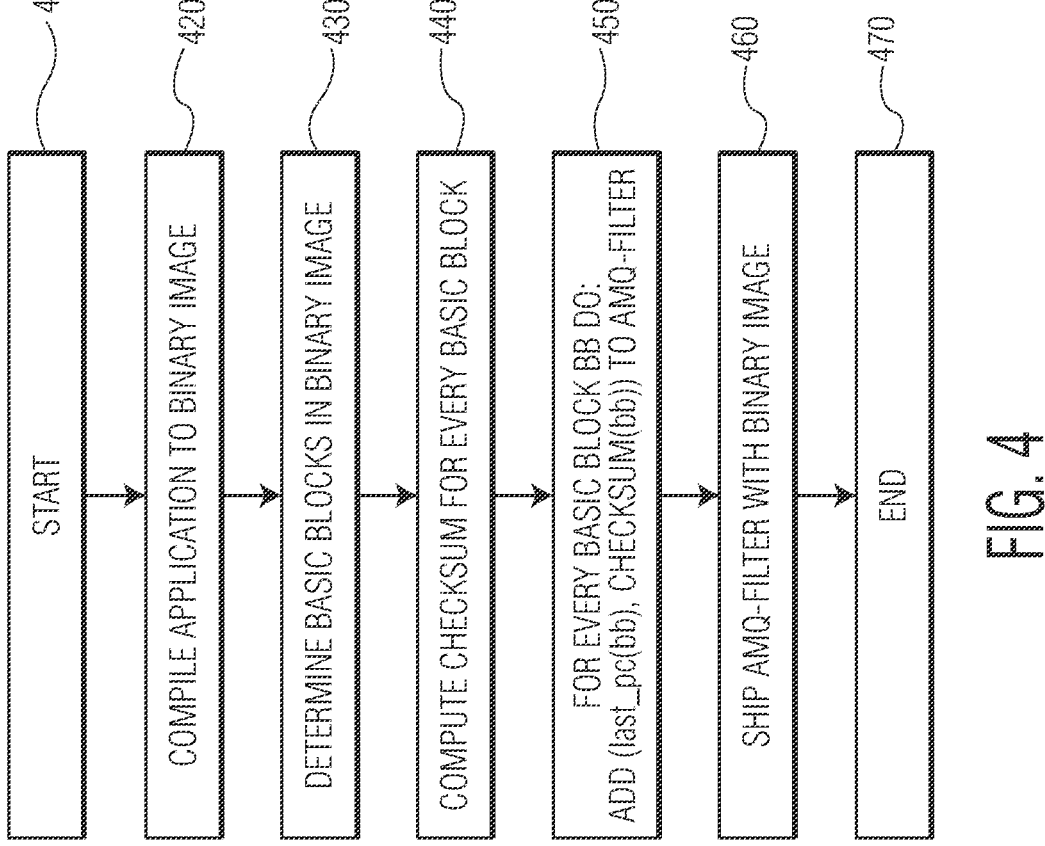
FIG. 4 illustrates an algorithm for producing an AMQ-filter, according to an implementation of the present disclosure.

FIG. 4 illustrates an algorithm 400 for producing an AMQ-filter, according to an implementation of the present disclosure. The algorithm 400 can be implemented using a computing device. The algorithm 400 begins at 410 and advances to 420.

In 420, a processor of the computing device executes a compiler to compile an application including a plurality of basic blocks into a binary image. This processor differs from the processing core 220 protected against fault attacks by the AMQ-filter. The algorithm 400 then advances to 430.

In 430, the processor determines the basic blocks in the binary image produced in 420. For example, the processor can determine the first instruction and trigger instruction, where applicable, for each basic block. The algorithm 400 then advances to 440.

In 440, the processor computes a checksum for each basic block in the binary image. The checksum can be based on the respective first instruction and the respective trigger instruction, for example. In implementations in which the AMQ-filter is to be checked after a predetermined number of instructions, the processor can compute the tuple of the last program counter of the group of the predetermined number of instructions and the checksum over the group. The algorithm 400 then advances to 450.

In 450, the processor adds, to the AMQ-filter, the tuple of the last program counter in the basic block and the checksum over the basic block. The processor adds this tuple for each basic block in the application. As discussed above, the checksum can be a CRC, for example.

The algorithm 400 then advances to 460.

In 460, the AMQ-filter is shipped with the binary image. The algorithm 400 then advances to 470 and concludes.

Thus, some implementations according to the present disclosure combine the expected checksum values with the PC of the trigger instruction. Tuples resulting from this combination then are stored in an AMQ-filter.

There are several possible modifications to the implementations discussed above. For example, some implementations can include a buffer between the processing core and the AMQ-filter.

In various implementations, the processing core transmits a tuple of a PC of a trigger instruction and a checksum to the buffer, when the processing core determines that the trigger instruction has been decoded. The buffer stores the tuple. The AMQ-filter can retrieve the tuple from the buffer. When the AMQ-filter retrieves the tuple, the buffer can clear the tuple from its memory.

If the processing core executes multiple trigger instructions shortly after each other, the buffer can become full.

In some implementations, when the buffer is full, the buffer can assert or transmit a full-buffer signal to the processing core. Upon receiving the full-buffer signal, the processing core can pause executing instructions (e.g., at 355). When the buffer is no longer full, the buffer can refute (e.g., stop asserting) the full-buffer signal or can transmit a not-full buffer signal. The processing core can resume executing instructions, when the full-buffer signal is no longer asserted or when the not-full buffer signal is received. Thus, the processing core can continue processing instructions, if the AMQ-filter is busy with a previous check, as long as there is space available in the buffer.

In a further implementation, when the buffer receives a tuple of a PC and a checksum, the buffer can determine whether the buffer is storing that tuple. If the buffer determines that the buffer is already storing the tuple, then the buffer can drop (e.g., not additionally store) the received tuple. If the buffer determines that the buffer is not already storing the tuple, then the buffer can store the tuple.

Thus, if the buffer is already storing the received tuple, then the AMQ-filter can skip checking the additional received instance of the tuple. Such a buffer can reduce the work performed by the AMQ-filter and therefore also can reduce the number of memory requests made by the AMQ-filter.

In another implementation, such a buffer can look ahead to a potential future basic block and produce the tuple of the program counter of the future basic block and the checksum of the future basic block. If (or when) the processing core 220 enters the future basic block, then the processing core 220 can transmit a signal to the buffer. Upon receiving the signal, the buffer can send the PC and checksum tuple to the AMQ-filter query module 240. Thus, the AMQ-filter query module 240 can return an error response to the processing core 220 more quickly, potentially preventing the processing core 220 from a fault attack at an earlier time. It is also possible to associate multiple valid checksum values to a trigger instruction. Then, tuples with each of the n checksum value (PC, cs1) . . . (PC, csn) can be stored in the AMQ-filter. This association makes sense in the case that the respective basic block can be entered by falling-through from its predecessor basic block in memory and by a jump.

Figure 5:
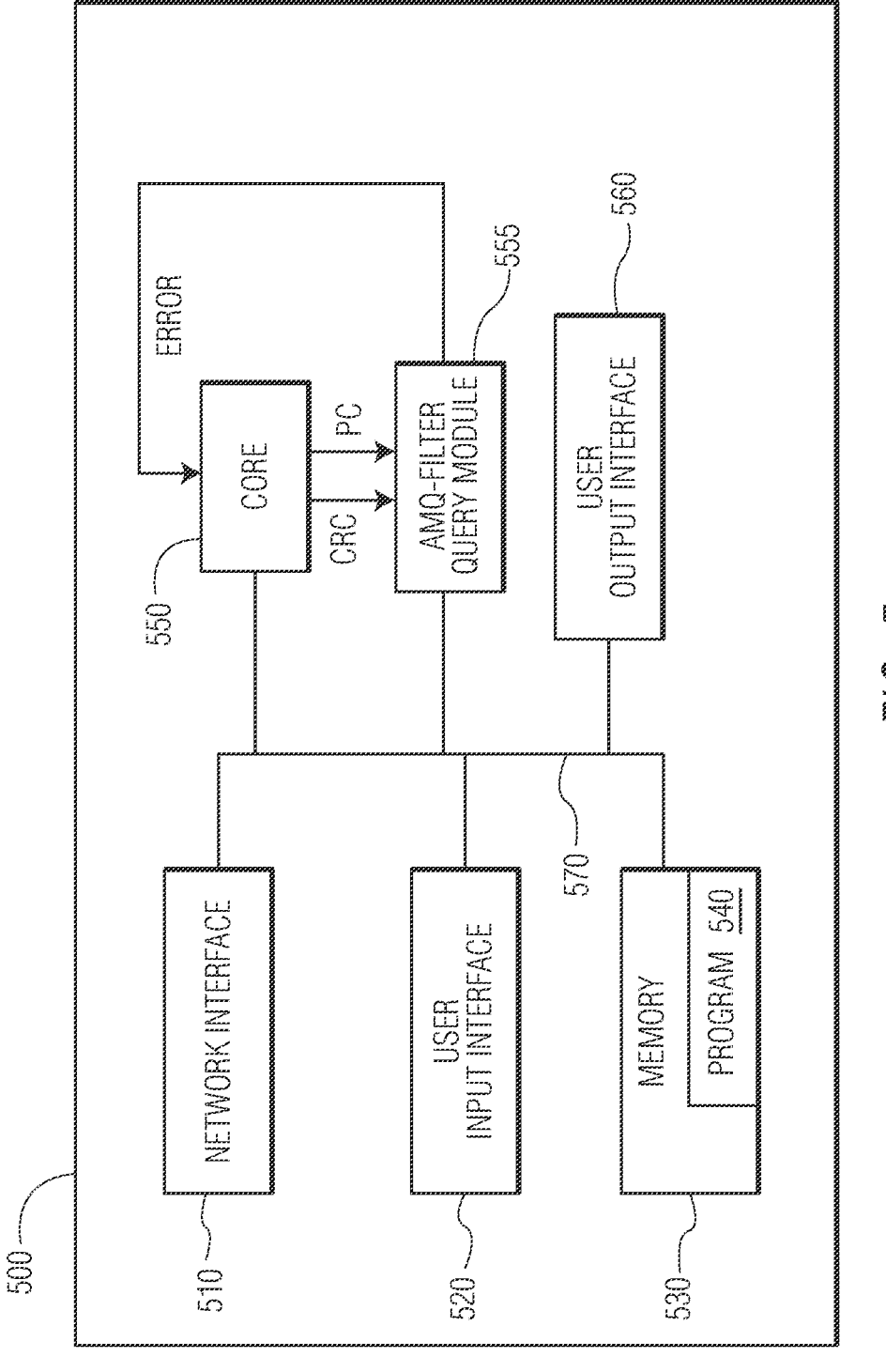
FIG. 5 illustrates a computing device, according to an implementation of the present disclosure.

FIG. 5 illustrates a computing device 500, according to an implementation of the present disclosure. The computing device 200 can be included in and/or implemented by the computing device 500.

The computing device 500 can include a network interface 510, a user input interface 520, a memory 530, a program 540, a core 550, an AMQ-filter query module 555, a user output interface 560, and a bus 570.

Although illustrated within a single housing, the computing device 500 can be distributed across plural housings or sub-systems that cooperate in executing program instructions. In some implementations, the computing device 500 can be or include one or more blade server devices, stand-alone server devices, personal computers (including laptop computers and tablet computers), routers, hubs, switches, bridges, firewall devices, intrusion detection devices, main-frame computers, network-attached storage devices, smart-phones and other mobile telephones, and other computing devices. The computing device 500 can execute the Windows OS, macOS, Android, or Linux in many implementations, and the device hardware can be configured according to a Symmetric Multi-Processing (SMP) architecture or a Non-Uniform Memory Access (NUMA) architecture.

The network interface 510 can provide one or more communication connections and/or one or more devices that allow for communication between the computing device 500 and other computing systems (not shown) over a communication network, collection of networks, or the air, to support the control flow integrity protection, outlined herein. The network interface 510 can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 520 can receive one or more inputs from a human. The user input interface can be or include a mouse, a touchpad, a keyboard, a touchscreen, a trackball, a camera, a microphone, a joystick, a game controller, a scanner, or any other input device.

The memory 530, also termed a "storage," can include or be one or more computer-readable storage media readable by the processing core 550 and that store software. The memory 530 can be implemented as one storage device or across multiple co-located or distributed storage devices or sub-systems. The memory 530 can include additional elements, such as a controller, who communicate with the processing core 550. The memory 530 can also include storage devices and/or sub-systems on which data and/or instructions are stored. The computing device 500 can access one or more storage resources to access information to carry out any of the processes indicated in this disclosure and, in particular, FIGS. 3-4.

In various implementations, the memory 530 stores the program 540 to execute at least a portion of the algorithms illustrated in FIGS. 3-4. Further, the program 540, when executed by the computing device 500 generally and/or the processing core 550 specifically, can direct, among other functions, performance of the operations of control flow integrity protection, as described herein.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 530 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processing core 550 (e.g., a processor) can be or include one or more hardware processors and/or other circuitry that retrieve and execute software, especially the program 540, from the memory 530. The processing core 550 can be implemented within one processing device, chip, or package and can also be distributed across multiple processing devices, chips, packages, or sub-systems that cooperate. In some implementations, the processing core 550 is or includes a Graphics Processing Unit (GPU).

The processing core 550 can have any register size, such as a 32-bit register or a 64-bit register, among others. The processing core 550 can include or interface with multiple cores. Implementations of the processing core 550 are not limited to any particular number of threads. The processing core 550 can be fabricated by any process technology, such as 14 nm process technology.

The AMQ-filter query module 555 can be or include the AMQ-filter query module 240. The AMQ-filter query module 555 can send information to and receive information from the memory 530 via the bus 570.

The user output interface 560 can output information to a human user. The user output interface 560 can be or include a display (e.g., a screen), a touchscreen, speakers, a printer, or a haptic feedback unit. In many implementations, the user output interface 560 can be combined with the user input interface 520. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the control flow integrity protection, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the computing device can be implemented in various manners, e.g., as a method, a system, a computer program product, or one or more computer-readable storage media. Accordingly, aspects of the present disclosure can take the form of a hardware implementation or an implementation combining software and hardware aspects that can generally be referred to herein as a "module" or a "system." Functions described in this disclosure can be implemented as an algorithm executed by one or more hardware processing units, e.g., the processing core 550. In various embodiments, different operations and portions of the operations of the algorithms described can be performed by different processing units. In some implementations, the operations can be achieved by reciprocating software between a processor and AMQ-filter. Furthermore, aspects of the present disclosure can take the form of one or more computer-readable media having computer-readable program code implemented, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 570 can share hardware resources with the memory 530 and the processing core 550. In this alternative implementation, the computing device 500 be provided with separate hardware resources including one or more processing cores, AMQ-filters, and memory elements.

In example implementations, various other components of the computing device 500 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 570. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints that might vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for all of the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, some functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application-specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method includes fetching, at a program counter value, an instruction of a basic block of code; decoding the instruction; updating a checksum value with a checksum of the instruction; and determining whether a tuple of the program counter value and the checksum value is in an approximate membership query filter (AMQ-filter).

Example M2 is the method of Example M1, further comprising: setting the program counter value to an exception handler address, if the tuple is not in the AMQ-filter.

Example M3 is the method of Example M2, wherein the determining is performed by transmitting the tuple to the AMQ-filter and receiving a response indicating the tuple is not in the AMQ-filter.

Example M4 is the method of any of Examples M1-M3, wherein the determining is performed, if the instruction is a last instruction of the basic block.

Example M5 is the method of any of Examples M1-M4, further comprising: resetting the checksum value, if the instruction is a first instruction of the basic block.

Example M6 is the method of any of Examples M1-M5, further comprising: resetting an instruction counter, if the instruction is a first instruction of the basic block; and incrementing the instruction counter, corresponding to the fetching, wherein the determining is performed, if the instruction counter exceeds a predetermined threshold.

Example M7 is the method of any of Examples M1-M6, further comprising: executing the instruction, if the tuple is in the AMQ-filter.

In Example A1, an apparatus includes an approximate membership query filter (AMQ-filter) that stores tuples of program counters and checksums; and a processing core that fetches, at a program counter value, an instruction of a basic block of code, decodes the instruction, and updates a checksum value with a checksum of the instruction, wherein the AMQ-filter is configured to determine whether a tuple of the program counter value and the checksum value is in the AMQ-filter.

Example A2 is the apparatus of Example A1, wherein the processing core is configured to set the program counter value to an exception handler address, if the tuple is not in the AMQ-filter.

Example A3 is the apparatus of Example A2, wherein the processing core is configured to transmit the tuple to the AMQ-filter and to receive a response indicating the tuple is not in the AMQ-filter.

Example A4 is the apparatus of any of Examples A1-A3, wherein the AMQ-filter is configured to determine whether the tuple is in the AMQ-filter, if the instruction is a last instruction of the basic block.

Example A5 is the apparatus of any of Examples A1-A4, wherein the processing core is configured to reset the checksum value, if the instruction is a first instruction of the basic block.

Example A6 is the apparatus of any of Examples A1-A5, wherein the processing core is configured to reset an instruction counter, if the instruction is a first instruction of the basic block, and to increment the instruction counter, corresponding to the processing core fetching the instruction, and the processing core is configured to determine whether the tuple is in the AMQ-filter, if the instruction counter exceeds a predetermined threshold.

Example A7 is the apparatus of any of Examples A1-A6, wherein the processing core is configured to execute the instruction, if the tuple is in the AMQ-filter.

In Example F1, an apparatus includes means for fetching, at a program counter value, an instruction of a basic block of code, for decoding the instruction, for updating a checksum value with a checksum of the instruction; and means for determining the validity of a tuple of the program counter value and the checksum value.

Example F2 is the apparatus of Example F1, wherein the means for fetching sets the program counter value to an exception handler address, if the tuple is not valid.

Example F3 is the apparatus of Example F2, wherein the means for fetching transmits the tuple to the means for determining and receives a response indicating the tuple is not valid.

Example F4 is the apparatus of any of Examples F1-F3, wherein the means for determining determines whether the tuple is valid, if the instruction is a last instruction of the basic block.

Example F5 is the apparatus of any of Examples F1-F4, wherein the means for fetching resets the checksum value, if the instruction is a first instruction of the basic block.

Example F6 is the apparatus of any of Examples F1-F5, wherein the means for fetching resets an instruction counter, if the instruction is a first instruction of the basic block, and increments the instruction counter, corresponding to fetching the instruction, and the means for determining determines whether the tuple is valid, if the instruction counter exceeds a predetermined threshold.

Example F7 is the apparatus of any of Examples F1-F6, wherein the means for fetching executes the instruction, if the tuple is valid.

We claim:

1. A method, comprising:

fetching, at a program counter value, an instruction of a basic block of code;

decoding the instruction;

updating a checksum value by adding a value of a checksum of the instruction to a current checksum value based on other instructions of the basic block;

determining whether a tuple of the program counter value and the updated checksum value is in an approximate membership query filter (AMQ-filter); and performing, at a processing circuitry, an operation to address a fault attack based on the tuple not being in the AMQ-filter.

2. The method of claim 1, wherein performing the operation comprises:

setting the program counter value to an exception handler address based on the tuple not being in the AMQ-filter.

3. The method of claim 2, wherein the determining is performed by transmitting the tuple to the AMQ-filter and receiving a response indicating the tuple is not in the AMQ-filter.

4. The method of claim 1, wherein the determining is performed based on the instruction being a last instruction of the basic block.

5. The method of claim 1, further comprising:

resetting the current checksum value based on the instruction being a first instruction of the basic block.

6. The method of claim 1, further comprising:

resetting an instruction counter based on the instruction being a first instruction of the basic block; and incrementing the instruction counter, corresponding to the fetching, wherein the determining is performed based on the instruction counter exceeding a predetermined threshold.

7. The method of claim 1, further comprising:

executing the instruction based on the tuple being in the AMQ-filter.

8. An apparatus, comprising:

an approximate membership query filter (AMQ-filter) that stores tuples of program counters and checksums; and processing circuitry configured to fetch, at a program counter value, an instruction of a basic block of code, decode the instruction, and update a checksum value by adding a value of a checksum of the instruction to a current checksum value based on other instructions of the basic block, wherein the AMQ-filter is configured to determine whether a tuple of the program counter value and the updated checksum value is in the AMQ-filter, and wherein the processing circuitry is configured to perform an operation to address a fault attack based on the tuple not being in the AMQ-filter.

9. The apparatus of claim 8, wherein the operation comprises setting the program counter value to an exception handler address based on the tuple not being in the AMQ-filter.

10. The apparatus of claim 9, wherein the processing circuitry is configured to transmit the tuple to the AMQ-filter and to receive a response indicating the tuple is not in the AMQ-filter.

11. The apparatus of claim 8, wherein the AMQ-filter is configured to determine whether the tuple is in the AMQ-filter based on the instruction being a last instruction of the basic block.

12. The apparatus of claim 8, wherein the processing circuitry is configured to reset the current checksum value based on the instruction being a first instruction of the basic block.

13. The apparatus of claim 8, wherein the processing circuitry is configured to reset an instruction counter based on the instruction being a first instruction of the basic block, and to increment the instruction counter, corresponding to the processing circuitry fetching the instruction, and the AMQ-filter is configured to determine whether the tuple is in the AMQ-filter, based on the instruction counter exceeding a predetermined threshold.

14. The apparatus of claim 8, wherein the processing circuitry is configured to execute the instruction, based on the tuple being in the AMQ-filter.

15. A non-transitory computer readable medium embodying a set of executable instructions, the set of executable instructions to manipulate at least one processor to:

fetch, at a program counter value, an instruction of a basic block of code;

decode the instruction;

update a checksum value by adding a value of a checksum of the instruction to a current checksum value based on other instructions of the basic block;

determine whether a tuple of the program counter value and the updated checksum value is in an approximate membership query filter (AMQ-filter); and perform an operation to address a fault attack based on the tuple not being in the AMQ-filter.

16. The non-transitory computer readable medium of claim 15, the set of executable instructions to manipulate the at least one processor to:

set the program counter value to an exception handler address based on the tuple not being in the AMQ-filter.

17. The non-transitory computer readable medium of claim 16, wherein the determining is performed by transmitting the tuple to the AMQ-filter and receiving a response indicating the tuple is not in the AMQ-filter.

18. The non-transitory computer readable medium of claim 15, wherein the determining is performed based on the instruction being a last instruction of the basic block.

19. The non-transitory computer readable medium of claim 15, the set of executable instructions to manipulate the at least one processor to:

reset the current checksum value based on the instruction being a first instruction of the basic block.

20. The non-transitory computer readable medium of claim 15, the set of executable instructions to manipulate the at least one processor to:

reset an instruction counter based on the instruction being a first instruction of the basic block; and increment the instruction counter, corresponding to the fetching, wherein the determining is performed based on the instruction counter exceeding a predetermined threshold.

<div align="center">*   *   *   *   *</div>